(No Model.)
W. LYMAN.
SIGHT FOR FIRE ARMS.
No. 327,957. Patented Oct. 6, 1885.
Fig. 1.
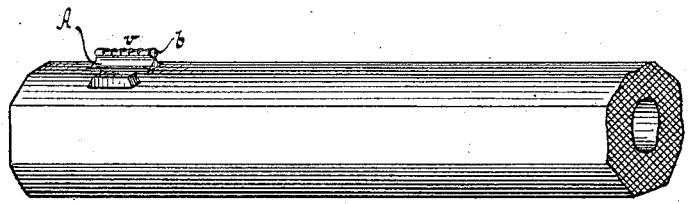
Fig. 2. Fig. 3.
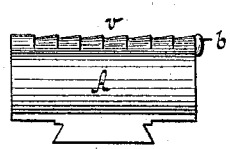 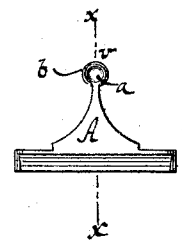
Fig. 4.
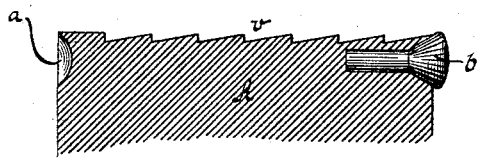
WITNESSES:
Otto Hupelaud
William Miller
INVENTOR
William Lyman
BY
Van Santvoord & Hauff
ATTORNEYS

UNITED STATES PATENT OFFICE.

WILLIAM LYMAN, OF MIDDLEFIELD, CONNECTICUT.

SIGHT FOR FIRE-ARMS.

SPECIFICATION forming part of Letters Patent No. 327,957, dated October 6, 1885.

Application filed June 4, 1885. Serial No. 167,636. (No model.)

*To all whom it may concern:*

Be it known that I, WILLIAM LYMAN, a citizen of the United States, residing at Middlefield, in the county of Middlesex and State of Connecticut, have invented new and useful Improvements in Gun-Sights, of which the following is a specification.

This invention has for its object to provide a gun-sight with novel means for guiding the eye to the line of vision; and to such end the invention consists in a gun-sight having in one end an aperture which extends along the length of the sight, and a head of ivory or other material of a color contrasting with that of the gun-sight, and having a shank inserted into the aforesaid orifice, with the head projecting longitudinally from the extremity of the sight, the said head having a seat in the strip comprising the sight, and being enlarged in diameter to conceal the material of the sight behind it.

The invention is illustrated in the accompanying drawings, in which Figure 1 is a perspective view of part of a gun-barrel and a gun-sight embodying my invention; Fig. 2, a side elevation of the gun-sight on an enlarged scale; Fig. 3, a face view of the same, and Fig. 4 a section taken on the line $x\ x$ of Fig. 3.

In order to enable those skilled in the art to make and use my invention, I will now describe the same in detail, referring to the drawings, where the letter A indicates a gun-sight composed of a longitudinal strip of metal or other material, having in its face end an aperture, Fig. 4, which extends in the direction of the length of the metal strip. The line of vision is indicated by the letter $v$.

The letter $b$ indicates a head composed of ivory or any other suitable material of a color contrasting with that of the gun-sight, and having a shank which is secured within the aperture in the gun-sight in such manner that the head projects longitudinally from the face end of the sight, and constitutes a guide for the eye to the line of vision $v$. Where this guide is applied to a bead-sight, as shown, it should be sufficiently large in diameter to conceal the metal behind it.

If desired, the line of vision of the gun-sight may be serrated, so that if the sun strikes the sight the rays of light are reflected in a direction away from the eye.

Having thus described my invention, what I claim is—

1. The combination, with a gun-sight having an aperture in one end extending in the direction of the length of the sight, of the ivory or other head $b$, of a color contrasting with that of the sight, and having a shank inserted into the aforesaid orifice, said head projecting longitudinally from the extremity of the sight, and having its seat in said sight, substantially as and for the purpose described.

2. A gun-sight consisting of the strip A, having an aperture in one end extending in the direction of the length of the strip, and the head $b$, of a color contrasting with that of the strip, and provided with a shank secured in the aperture, the said head seated in the strip at one end of the aperture, and projecting longitudinally from one extremity of the strip, substantially as shown and described.

In testimony whereof I have hereunto set my hand and seal in the presence of two subscribing witnesses.

WILLIAM LYMAN. [L. S.]

Witnesses:
 LYMAN A. MILLS,
 WM. P. RICHARDSON.